United States Patent
Kolinsky

[15] 3,698,439
[45] Oct. 17, 1972

[54] DISTRIBUTING SLIDE VALVE FOR LABORATORY PURPOSES

[72] Inventor: Miloslav Kolinsky, Praha, Czechoslovakia

[73] Assignee: Ceskoslovenska Akademie ved, Praha, Czechoslovakia

[22] Filed: May 5, 1971

[21] Appl. No.: 140,434

[30] Foreign Application Priority Data

May 8, 1970 Czechoslovakia ......3217/70

[52] U.S. Cl. ............................137/625.48, 251/191
[51] Int. Cl. .............................................F16k 11/02
[58] Field of Search ....137/625.48, 625.47; 251/325, 251/324, 189, 191, 187

[56] References Cited

UNITED STATES PATENTS

| | | | |
|---|---|---|---|
| 1,251,730 | 1/1918 | Youme et al. | 251/191 |
| 2,134,277 | 10/1938 | Sproull et al. | 251/191 |
| 2,159,640 | 5/1939 | Strom | 251/191 X |
| 2,828,767 | 4/1958 | Barusch | 137/625.48 X |
| 3,009,482 | 11/1961 | Schwartz | 137/625.48 X |
| 3,136,336 | 6/1964 | Priesmeyer | 137/625.48 X |
| 3,447,569 | 6/1969 | Kreuter | 251/189 X |
| 3,473,555 | 10/1969 | Martin et al. | 251/189 X |
| 3,570,540 | 3/1971 | McInnes et al. | 137/625.48 |
| 3,635,249 | 1/1972 | Kirkman | 137/625.48 |

*Primary Examiner*—Samuel Scott
*Attorney*—Richard Low and Murray Schaffer

[57] ABSTRACT

A distributing slide valve comprises a spindle consisting of at least one pair of conical truncated discs secured on an actuating rod. The pair of discs defines in respect of the valve bore an annular space for receiving a sealing ring and pressure means are provided to apply a force to the discs and to urge the rings against the bore. Each ring contains a system of individual ducts adapted to establish fluid communications between a system of fluid conduits which are to be operated by a valve.

4 Claims, 4 Drawing Figures

INVENTOR
MILOSLAV KOLINSKY

DISTRIBUTING SLIDE VALVE FOR LABORATORY PURPOSES

Background Of The Invention a. Field Of The Invention.

The invention relates to a distributing slide valve, or a dosing valve for laboratory purposes.

In some laboratory apparata and devices it is necessary to transfer very reliably liquids or gases through tubes to various places to change the flow direction, or to close the passage and the like. This is accomplished by means of cocks and taps, valves and slide valves of the most various designs and by using materials of various types with regard to resistance against materials passing through them.

b.) Description of the Prior Art

Various devices for changing the flow of a gas or a liquid have already been proposed. For example, in gas chromatographs it has already been proposed to use such a device for the passage of gases (nitrogen, argon, hydrogen). It consists of two circular plates made from metal and teflon arranged on a common shaft. The teflon plate is rotatingly, adjustable into two or more positions, and it is provided on the inner side adjacent the metal plate with grooves. This enables the transfer of gas from one tube into another.

Another changer of the flow of liquid, for example in gel chromatographs, is based on the principle of a rotary cock or tap with a teflon core, the circumference of which is provided with grooves through which the liquid is transferred into various tubes.

The two described examples of flow changers show certain disadvantages resulting in that they are not well sealed at the center and on the edges because the plate and the core cannot be pressed by means of a spring sufficiently and uniformly over the entire surface against the metal counter-piece. The rotating teflon core of the flow changer must be secured by means of a longitudinal carrier wedge which after frequent rotation presses into the core a groove, and the core does not return into the correct position. Tightness is also not always secured, particularly under higher pressures up to 20 atm. overpressure, due to the fact that the cylindrical core is expanded by means of two conical bodies on a common shaft in the direction towards the center Though this develops a strong pressure on the edges, in the direction towards the center it is weaker so that tightness is not secured.

Summary Of The Invention

It is therefore a general object of the invention to eliminate the above mentioned drawbacks of the known state of art in valve constructions of the mentioned type.

Another object of the invention is to provide a novel valve of the transfer or dosing type which is free of the above drawbacks.

A more specific object is to provide a valve comprising a traversable or shiftable spindle formed by a system of at least one pair (although four may be preferred) of truncated cones mounted firmly on a shaft which permits to provide a uniform pressure on a packing made from a plastic material, preferably teflon, by means of a regulating nut, both on the edges and in the center. This permits achievement of perfect tightness of the valve even under high pressures, for example up to 20 atm.

The valve in accordance with the invention will be best understood from the following specification to be read in conjunction with the accompanying drawings, in which.

Figure 1:
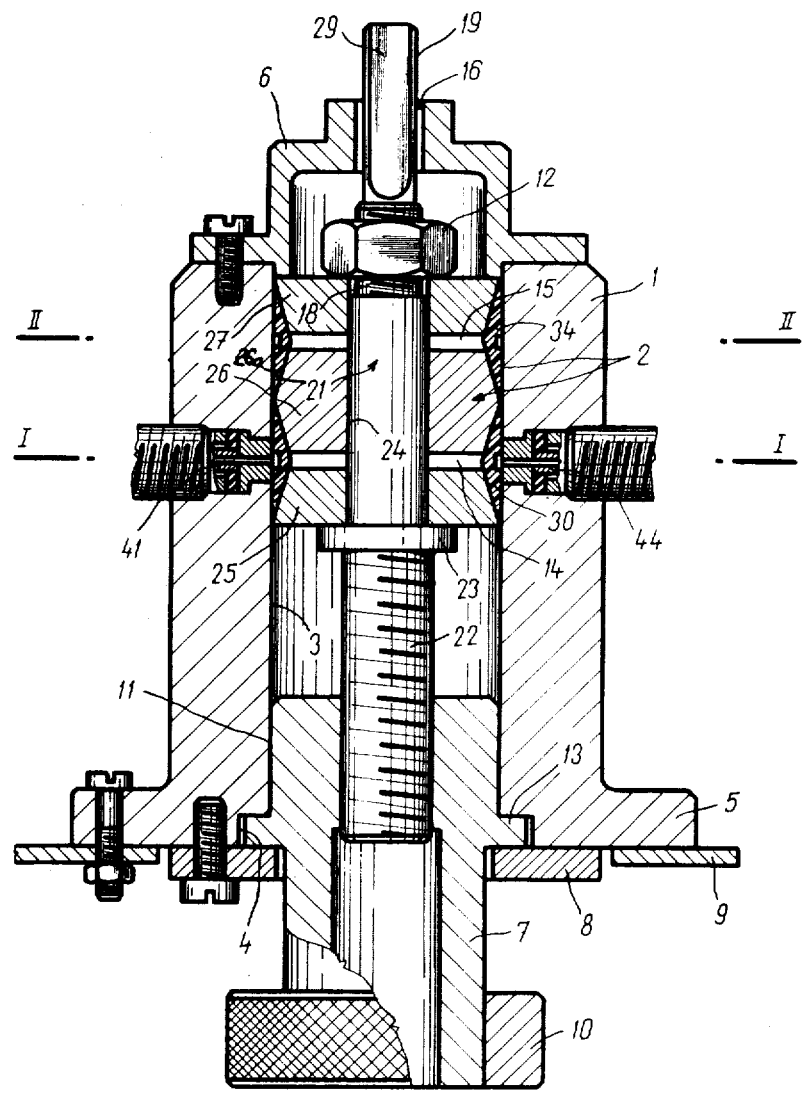
FIG. 1 is an elevational cross-section through the valve.

Referring now more particularly to FIG. 1, the valve comprises a body 1 in the cylindrical bore 3 of which there is arranged an axially traversable spindle 2. On one end of the bore 3, body 1 is provided with a circular recess 4. On its outer side the body 1 is provided with a flange 5 which serves for fastening the valve to plate.

Into recess 4 there fits a shoulder 13 of nut 7. The nut 7 is secured against longitudinal shifting with regard to the body 1 by a ring 8 attached on the lower side of the body holding shoulder 13 in the recess 4. The nut 7 is mounted with its cylindrical surface 11 rotatably on the bore 3 and screwed-on the threaded portion 22 of a rod 21. On its protruding end nut 7 is provided with a control wheel 10. The threaded portion 22 of piston rod 21 is terminated by a step or shoulder 23, after which follows a cylindrical portion 24 of the piston rod 21. On the cylindrical portion 24 there are traversably arranged four discs 25, 26, 26a and 27. Discs 25 and 27 have the shape of a simple truncated cone, while discs 26 and 26a are coupled in one integral part having the shape of twin-truncated cones the larger bases of which face each other. The discs are arranged so that between discs 25 and 27 the smaller bases of which face each other there are arranged discs 26 and 26a. Disc 25 rests with its larger base on shoulder 23. On the opposite side the position of discs 25, 26, 26a and 27 is limited by nut 12 screwed-on on thread 18 of rod 21, and resting on the larger base of disc 27.

Figures 2, 3:
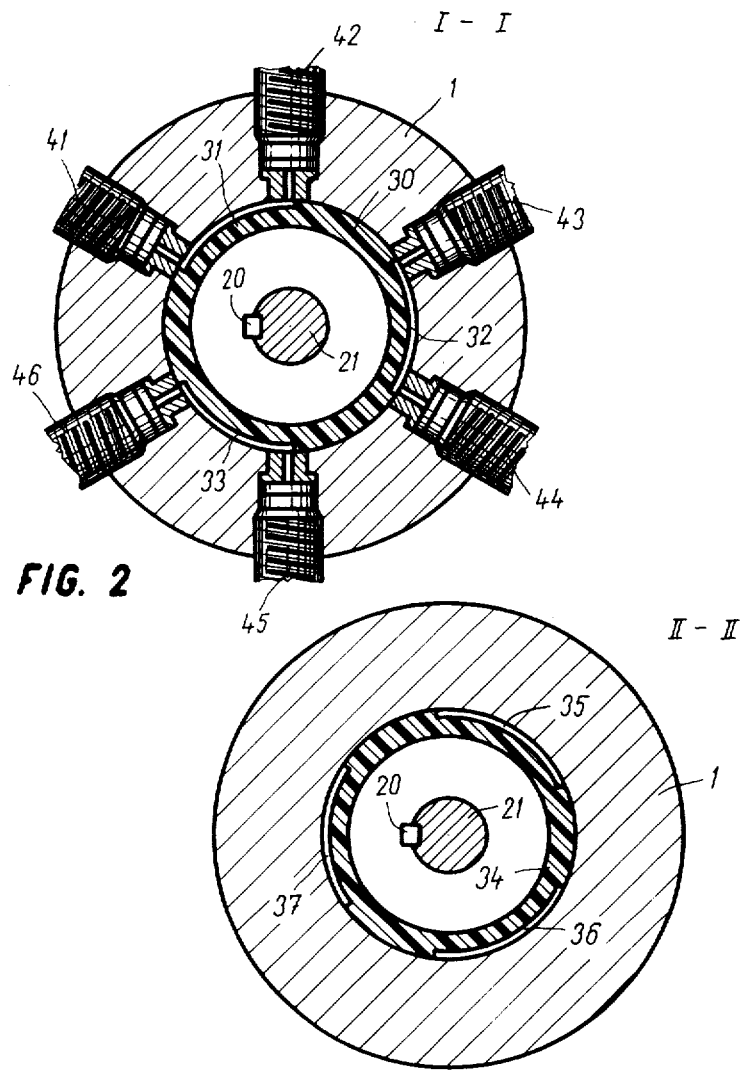
FIG. 2 is a section along the plane 1—1 in FIG. 1 illustrating the location of the supply and discharge conduits, or transfer conduits of the distribution system, and a first arrangement of the ducts of a traversable or shiftable spindle.
FIG. 3 is a section along the plane 11—11 in FIG. 1 illustrating a second arrangement of ducts of a shiftable spindle.

As shown in FIG. 2, the three discs 25, 26, 26a and 27 are secured against rotation of the cylindrical portion 24 by means of spring 20. The conical faces of discs 25, 26 and 27 define with respect to the cylindrical bore 3 two spaces in which sealing rings, 30, 34, made for example from teflon are inserted.

As shown in FIGS. 2, and 3 the sealing ring 30 has on its circumference three mutually separated grooves 31, 32 and 33 and the sealing ring 34 has mutually separated grooves 35, 36 and 37. On the upper side of body 1 there is attached cover 6. In this cover 6 an opening is provided 16 through which passes the end 19 of the rod 21. The rod 21 is secured against rotation by surface 29 on the end 19 which fits with a similarly arranged surface of the hole 16.

Figure 4:
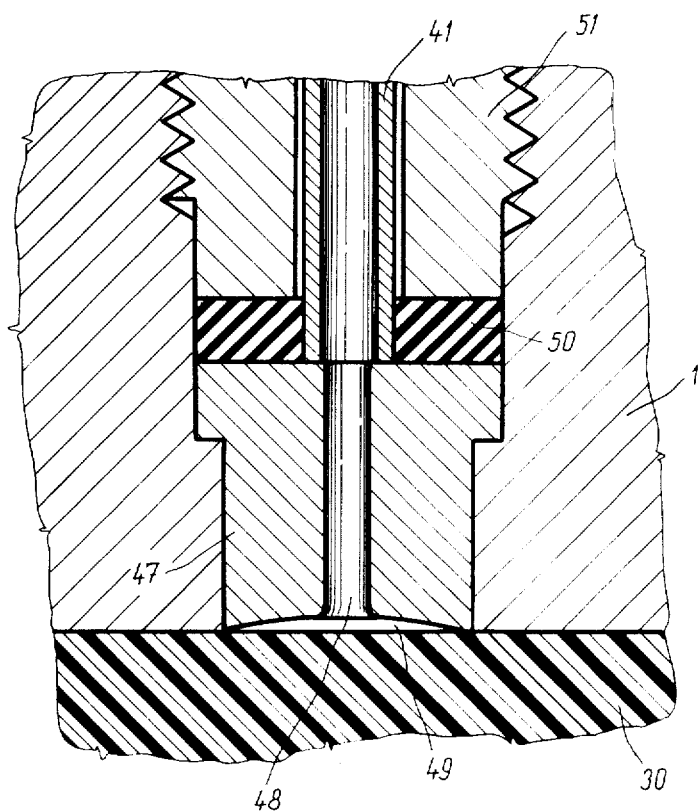
FIG. 4 is a detail of the mounts of openings in the body of the valve.

In a plane at right angles to the axis of the body 1 there open into the bore 3 six conduits 41, 42, 43, 44, 45 and 46. A detail of the opening of the individual conduit is shown for example for conduit 41 in FIG. 4. The end of the conduit 41 rests against the insertion with a hole 48 and pressed into the body 1. On the side facing the cylindrical bore 3 there is provided in insertion 47 a concave spherical surface 49. Conduit 41 is sealed with respect to the insertion 47 by a sealing ring 50 which is pressed on by a screwing 51. The spherical surface 49 on insertion 47 secures a gradual transition from the cylindrical bore 3 into the hole 48.

Thus the danger of damaging sealing ring 4 on the edge of the hole 48 during movement of spindle 2 is eliminated.

The function of the valve secures two modifications of connecting conduits 41 through 46. As follows from the preceding, the axial shifting movement of the spindle 2 is brought about by rotation of the nut 10 in the cylindrical bore 3. Due to the fact that the nut is secured against axial movement by shoulder 13, its rotation on the threaded portion 22 of the rod 21 causes movement of the rod 21. This permits adjustment of the rod 21 into position 1 in which, against conduits 41 through 49, there are adjusted grooves 31 through 33 of sealing ring 30, as shown in FIG. 1 and 2, or into position 11 in which, against conduits 41 through 49, there are adjusted grooves 35 through 37 of sealing ring 34. With respect to grooves 31 through 33 grooves 35 through 37 are rotated through 60°.

Therefore, in position 1 of the rod 21 groove 31 connects conduits 41 and 42, groove 32 connects conduits 43 and 44, and groove 33 connects conduits 45 and 46. In position 11, and because of the mentioned rotation of grooves 35 through 37, groove 35 connects conduits 42 and 43, groove 36 connects conduits 44 and 45, and groove 37 connects conduits 46 and 41.

The required pressure force for securing the functions of sealing rings 31 and 34 is produced in the following manner:

By means of nut 12 there is produced axial pressure on disc 27. Under the effect of the conical surface of disc 27 a part of the axial force is transformed into a radial component, at right angles to the wall of the cylindrical bore 3, the axial component being transferred by means of sealing ring 34 on disc 26, 26a, and by means of sealing ring 30 further upon disc 24. The radial forces created by resolution of the forces on the conical surfaces of discs 25 through 27 secure the sealing function of sealing rings 30 through 34. The condition for preserving the ability of regulating these pressure forces is the maintenance of gaps 14 and 15 between the individual discs 25, 26 and 27.

If should be understood that the invention is not limited to the above described embodiment. It is for example possible to employ a larger number of sealing rings arranged one after the other, and thus to achieve a larger number of modifications of the connections between conduits 41 through 46.

The transfer or dosing valve in accordance with the invention as described hereinbefore is particularly suitable for automatic dosing in a multiposition system, more particularly for transferring or dosing gases and volatile liquids up to pressures of 20 atm.

By repetition of the pairs of discs illustrated in FIG. 1 it is possible to create a complex spindle which permits two or more changes-over. This is important, particularly in an automatic dosing device which permits progressive connection into one or several positions.

The movement of the spindle from one position into the other is accomplished manually by means of a screw or automatically by means of a servomotor. The second method of movement is particularly advantageous because it permits easy shifting of the spindle even if the spindle is drawn into the valve body so that it cannot be moved manually. This is very advantageous in the case when it is necessary to preserve tightness, particularly under high pressures.

I claim:

1. A distributing slide valve comprising
a body having a bore provided with a smooth surface, said body including a plurality of conduits arranged peripherally around the body and opening at their inner end out of said smooth surface,
a spindle mounted in said bore for axial slide motion, said spindle containing
a rod,
at least one pair of conical truncated discs secured on said rod, each disc facing with its truncated end the truncated end of the other disc, the pair of discs defining thus an annular space in respect of said bore,
a sealing ring inserted in said annular space,
means applying axial pressure to said discs mounted on said rod to urge said sealing ring against said smooth surface of the bore,
a system of individual ducts provided in said sealing ring adapted to establish in one position of the spindle in predetermined order of fluid communication between said conduits, and
actuating means for providing axial motion to the spindle to bring it into preselected positions.

2. A distributing slide valve as claimed in claim 1 wherein an insertion is disposed at the inner end of each conduit, said insertion having a concave surface at the side facing the spindle, the edges of the insertion being flush with the smooth surface of the bore whereby the gradual transitions between the bore and the conduits is obtained.

3. A distributing slide valve as claimed in claim 2 wherein said sealing rings is of teflon-polytetrafluorethylene.

4. A distributing slide valve comprising a body having a bore with a smooth surface, said body including a plurality of conduits arranged peripherally in one plane around the body and opening at their end out of said smooth surface,
a spindle mounted in said bore for axial slide motion, said spindle containing
a rod,
two pairs of conical truncated discs secured on the rod the truncated end of each disc facing the truncated end of the other disc belonging to the same pair of discs each pair of discs defining thus an annular space in respect of said bore, sealing rings each inserted in one of said annular spaces adapted to maintain a gap between the truncated ends of the discs,
means applying axial pressure to said discs, said means being mounted on said rod to urge said sealing rings against said smooth surface of the bore,
a first system of individual ducts provided in the first sealing ring in a plane parallel to the plane of said conduits and adapted in one position of the spindle to establish in predetermined order fluid communication between said conduits, a second system of individual ducts provided in the second sealing ring in a plane parallel to the plane of said conduits and adapted to establish in the second position of the spindle in another predetermined order fluid communication between said conduits, actuating means engaging said rod to provide axial motion of the spindle to bring it into one of said positions.

* * * * *